(12) United States Patent
D'Apuzzo et al.

(10) Patent No.: US 12,032,147 B2
(45) Date of Patent: Jul. 9, 2024

(54) MICROSCOPY SYSTEMS

(71) Applicant: Hewlett-Packard Development Company, L.P., Spring, TX (US)

(72) Inventors: Fausto D'Apuzzo, Palo Alto, CA (US); Viktor Shkolnikov, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 561 days.

(21) Appl. No.: 17/255,808

(22) PCT Filed: Oct. 1, 2018

(86) PCT No.: PCT/US2018/053723
§ 371 (c)(1),
(2) Date: Dec. 23, 2020

(87) PCT Pub. No.: WO2020/072030
PCT Pub. Date: Apr. 9, 2020

(65) Prior Publication Data
US 2021/0239958 A1    Aug. 5, 2021

(51) Int. Cl.
| | |
|---|---|
| G02B 21/12 | (2006.01) |
| G01N 15/0227 | (2024.01) |
| G01N 15/10 | (2024.01) |
| G01N 15/14 | (2006.01) |
| G01N 15/1433 | (2024.01) |
| G01N 15/1434 | (2024.01) |

(Continued)

(52) U.S. Cl.
CPC ......... *G02B 21/12* (2013.01); *G01N 15/0227* (2013.01); *G01N 15/1433* (2024.01); *G01N 15/1434* (2013.01); *G01N 15/1459* (2013.01); *G02B 21/0004* (2013.01); *G02B 21/36* (2013.01); *G01N 2015/1006* (2013.01); *G01N 2015/1493* (2013.01)

(58) Field of Classification Search
CPC .... G02B 21/00; G02B 21/12; G02B 21/0004; G02B 21/06; G02B 21/24; G02B 21/26; G02B 21/36–362; G02B 5/10; G01N 15/0227; G01N 15/1434; G01N 15/1459; G01N 15/1463; G01N 2015/03; G01N 2015/1006; G01N 2015/1493; G01N 2015/144; G01N 2015/149; B81B 7/04
See application file for complete search history.

(56) References Cited

U.S. PATENT DOCUMENTS

| | | |
|---|---|---|
| 7,883,175 B2 | 2/2011 | Otsuka et al. |
| 7,901,026 B2 | 3/2011 | Albertalli et al. |

(Continued)

FOREIGN PATENT DOCUMENTS

| | | | |
|---|---|---|---|
| DE | 20012348 U1 * | 9/2000 | ............... G02B 5/08 |
| FR | 2789068 A1 * | 8/2000 | ......... G02B 21/0004 |
| JP | 4305209 B2 | 7/2009 | |

*Primary Examiner* — Derek S. Chapel
(74) *Attorney, Agent, or Firm* — Foley & Lardner LLP (57) ABSTRACT

A system and a method for imaging microfluidic ejectors during operation. An example provides a microscopy system, that includes a plurality of microfluidic ejectors. A mirror is disposed in a droplet path of the plurality of microfluidic ejectors, wherein the droplet path passes through an opening in the mirror. An optical system is focused on the plurality of microfluidic ejectors through the mirror, wherein the optical system comprises a camera.

19 Claims, 9 Drawing Sheets

(51) Int. Cl.
*G02B 21/00* (2006.01)
*G02B 21/36* (2006.01)

(56) References Cited

U.S. PATENT DOCUMENTS

| | | |
|---|---|---|
| 8,325,342 B2 | 12/2012 | Ali et al. |
| 8,449,068 B2 | 5/2013 | Govyadinov |
| 8,684,980 B2 | 4/2014 | Hunter et al. |
| 9,522,527 B2 | 12/2016 | Clark et al. |
| 9,937,522 B2 | 4/2018 | Hart et al. |
| 11,391,660 B2* | 7/2022 | D'Apuzzo ......... G01N 15/1459 |
| 11,486,814 B2* | 11/2022 | D'Apuzzo ......... G01N 15/1463 |
| 2005/0248605 A1 | 11/2005 | Pinard et al. |
| 2006/0006067 A1* | 1/2006 | Unger ................... G02B 21/36 |
| | | 204/603 |
| 2008/0261326 A1 | 10/2008 | Dudenhoefer et al. |
| 2008/0290263 A1 | 11/2008 | Feng et al. |
| 2009/0325217 A1* | 12/2009 | Luscher ................. C12M 47/04 |
| | | 435/286.1 |
| 2010/0297759 A1* | 11/2010 | Kanda ................ G01N 33/5005 |
| | | 435/286.1 |
| 2011/0312081 A1 | 12/2011 | Azimi et al. |
| 2014/0376816 A1* | 12/2014 | Lagae ..................... G06F 18/24 |
| | | 382/134 |
| 2017/0259560 A1 | 9/2017 | Sreenivasan et al. |
| 2017/0322406 A1* | 11/2017 | Sirat ................. G01N 21/6458 |

\* cited by examiner

MICROSCOPY SYSTEMS

BACKGROUND

High resolution microscopy of inkjet nozzles while printing is a challenge. Generally, a protective window is used to protect the optics during imaging, which must be regularly replaced.

DESCRIPTION OF THE DRAWINGS

Certain exemplary embodiments are described in the following detailed description and in reference to the drawings, in which.

DETAILED DESCRIPTION

More importantly, this solution is destructive in terms of dispensing, as it interferes with the dispensing process and its implementation is limited to statistical performance evaluation. The techniques described herein are directed to external optical imaging of microfluidic ejector chips, or printheads, that have reservoir surface on one side of the chip and a fluid exit surface, through which fluids exit, on an opposite side of the chip. The imaging cannot be performed through a reservoir surface, as traditional reservoirs, which often have a plastic "pen" body, or metalized blister packs, are opaque. It is also impractical to image through the exit surface as the ejected fluids coat the optics and may interfere with the desired optical surface.

Further, imaging of microfluidic ejectors during operation is difficult. A protective window may be used to protect the optics. However, the protective window has to be continuously replaced. More importantly, this solution interferes with the dispensing process, making longer observations difficult, and, thus, limiting its implementation to statistical performance evaluation.

In the examples described herein, an imaging system, such as a microscope, monitors the microfluidic ejectors of the microfluidic ejector array without interfering with ejected material reaching a target destination, allowing imaging during a printing process. The imaging system includes an annular mirror, for example, having a central aperture, that is placed in the optical path to focus the imaging system on the microfluidic ejector array. Ejected droplets pass through the aperture into the target destination.

In one example, the microfluidic ejectors are part of a printhead incorporated into a printer cartridge.

Figure 1:
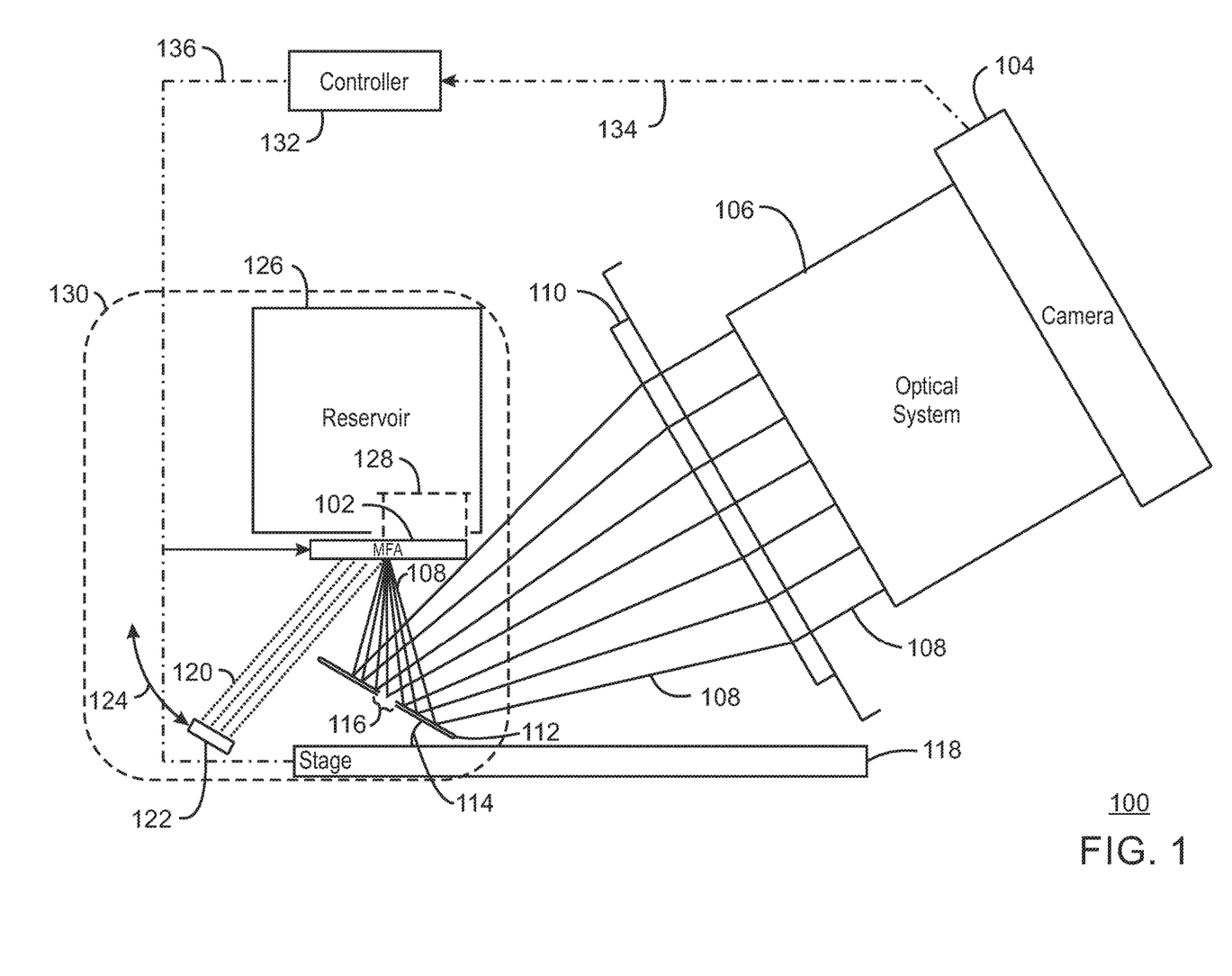
FIG. 1 is a drawing of a microscopy system that uses a microfluidic ejector array, in accordance with examples.

FIG. 1 is a drawing of a microscopy system 100 that images a microfluidic ejector array 102, in accordance with examples. The microscopy system 100 has an optical sensor, such as a camera 104, to collect images of the microfluidic ejector array 102. The camera 104 may be a high frame-rate imaging system, a multichannel spectrophotometer, or any number of other optical sensors. An optical system 106 is used to process the light 108 arriving from the microfluidic ejector array 102 and focus it on the sensor of the camera 104. As used herein, a high frame-rate imaging system may collect images at about 500 frames per second (fps), about 1000 fps, about 1500 fps, about 3000 fps, about 10,000 fps, or higher depending on the application. Examples in which each frame includes information, such as during the firing of a thermal ink jet printer cartridge, may use higher imaging rates.

As described herein, in some examples, the microfluidic ejectors of the microfluidic ejector array 102 use thermal resistors to eject fluids from nozzles by heating to create bubbles that force fluid from the nozzles. In other examples, the microfluidic ejectors use piezoelectric cells to force fluid from the nozzles.

The optical system 106 may include lenses, filters, diffraction gratings, and other devices to focus the incoming light 108 on a sensor array in the camera 104. In some examples, the optical system 106 includes a monochromator that allows a narrow frequency band of the light 108 to reach the camera 104. In various examples, the monochromator is adjusted to different frequencies of the light 108 for operation. In other examples, the optical system 106 divides the incoming light 108 into different channels, each of which are sent to a different sensor within the camera 104, providing multispectral analysis of the incoming light 108. In various examples, the optical system 106 and camera 104 are used to perform brightfield, dark-field, florescence, hyperspectral, and other optical analyses. As used herein, a hyperspectral analysis system uses multiple frequencies of light to analyze an image.

A focusing lens 110 is used to focus the optical system 106 on the light 108 coming from the microfluidic ejector array 102. The focusing lens 110 may be a single lens, a group of lenses, or other optical apparatus. In an example, the focusing lens 110 is a Fresnel lens, providing a wide area lens without adding significant complexity. In other examples, the focusing lens 110 is integrated with the optical system, and includes multiple elements, such as a microscopy objective.

An annular mirror 112 is used to direct the light from the microfluidic ejector array 102 towards the focusing lens 110. The annular mirror 112 is placed at an appropriate angle 114, such as 30°, 45°, and the like. An opening 116 in the annular mirror 112 is positioned directly under the microfluidic ejector array 102 to allow droplets from the microfluidic ejectors to pass through to a stage 118 located below the annular mirror 112. In various examples, the opening 116 is about 0.5 mm in diameter, about 1 mm in diameter, or about 2 mm in diameter, among others. In other examples, the opening 116 is generally oblong, for example, an oval that is about 1 mm across and about 3 mm long, or about 0.5 mm across and about 1.5 mm long, and aligned with the microfluidic ejector array 102. In examples, the opening 116 in the mirror is elliptical.

The stage 118 may be moved to place different collection vessels under the microfluidic ejector array 102, such as individual wells on a multi-well plate, a waste container, a micro sample tube, or any combinations thereof. In some examples, the stage 118 is an x-y translation stage, or x-y stage, that can move any of a number of wells in an x-y grid in a multiwell plate. In other examples, the stage 118 is a linear translation stage that can move a micro sample tube under a microfluidic ejector in the microfluidic ejector array 102 for collection or disposal of cells.

The microfluidic ejector array 102 may be lit using any number of different techniques. In some examples, illumination 120 from a light source 122 is directed towards the microfluidic ejector array 102. As used herein, the light source 122 is a side illumination system. The illumination 120 may be focused on the microfluidic ejector array 102, or broadly illuminate the base of the cartridge. In various examples, this is adjusted to determine whether a brightfield or a dark-field imaging technique is used. Further, the light source 122 may be moved to different locations relative to the microfluidic ejector array 102, as indicated by arrow 124. In other examples, the optical system 106 may include a co-linear illumination system as described with respect to FIG. 3. In some examples, the light source 122 is a laser, such as a laser photodiode.

The reservoir 126 holds a fluid that is to be ejected from the microfluidic ejector array 102. In one example, the fluid is an ink, such as a black or colored ink used for ink jet printing. In another example, the reservoir 126 holds a fluid that includes a material of interest, such as molecules, particles, or cells. The material of interest may be identified by optical properties determined by imaging, including fluorescence, or other spectroscopic properties, or shape, size, or other physical properties. The reservoir 126 feeds into a chamber 128 that feeds the microfluidic ejector array 102. In one example, the chamber 128 is around 6 mm in size and is fluidically coupled to the nozzles of the microfluidic ejector array 102.

The reservoir 126, chamber 128, microfluidic ejector array 102, stage 118, and light source 122 may form a single material isolation unit 130. The material isolation unit 130 may be assembled from individual parts, or may be made into a single integrated unit for easier handling.

The microscopy system 100 includes a controller 132 that is coupled to the camera 104 through an image data link 134. The controller 132 may analyze images from the camera 104 to identify target emissions, for example, from molecules or particles, molecules, and the like, proximate to a microfluidic ejector in the microfluidic ejector array 102. The controller 132 is also coupled through control links 136 to the microfluidic ejectors of the microfluidic ejector array 102, and to motors controlling the stage 118.

In an example, the controller 132 fires the microfluidic ejectors of the microfluidic ejector array 102, while capturing frames from the camera 104. The captured images to determine efficiency of firing, nozzle performance, flow issues, and other diagnostic information about the microfluidic ejector array 102, nozzles, and the like. The stage 118 may be moved to allow printing on a target fixed to the stage 118. This can be used to correlate image information on firing of the microfluidic ejector array 102 to printing quality.

In another example, when the controller 132 detects a target emission proximate to a microfluidic ejector, the controller 132 uses the motors of the stage 118 to move a target well under the microfluidic ejector. The controller 132 then activates a microfluidic ejector to eject the target cell into the target well. The controller 132 then moves a different container, such as a waste container, under the microfluidic ejector to capture nontarget cells.

Figure 4:
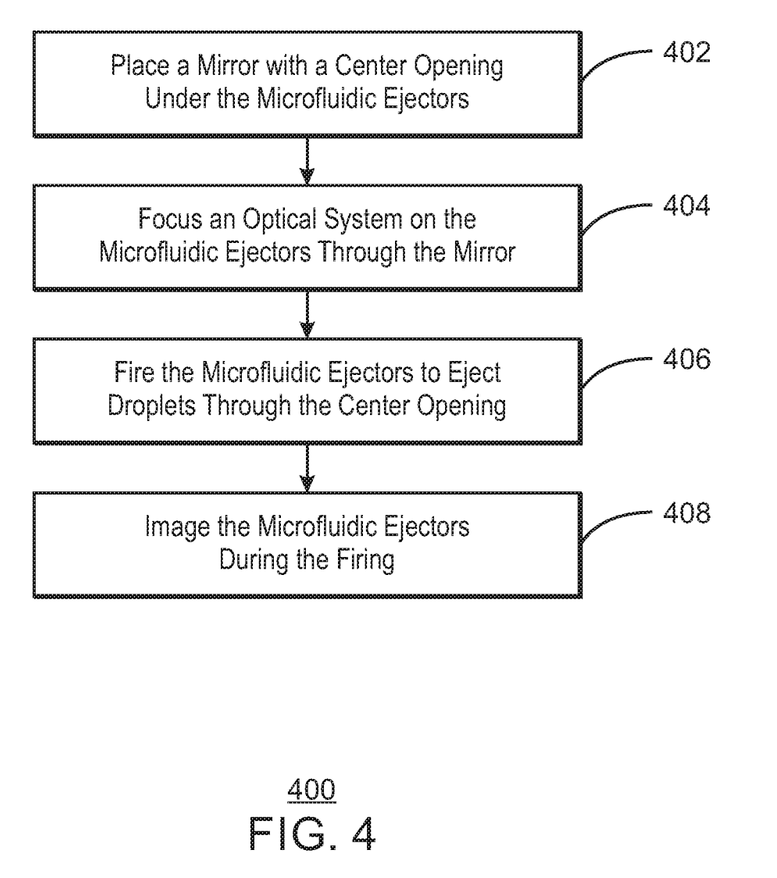
FIG. 4 is a process flow diagrams of a method for sorting cells using a microfluidic ejector, in accordance with examples.

The imaging procedure is discussed in greater detail with respect to FIG. 4. The controller 132 is discussed in greater detail with respect to FIG. 7.

The optical system 106, camera 104, and annular mirror 112 form an optical device that is used to probe the materials in the microfluidic ejector array 102. In various examples, the optical device is a microscope, fluorimeter, a particle size analyzer, an image recognition system, or a combination thereof.

Figure 2:
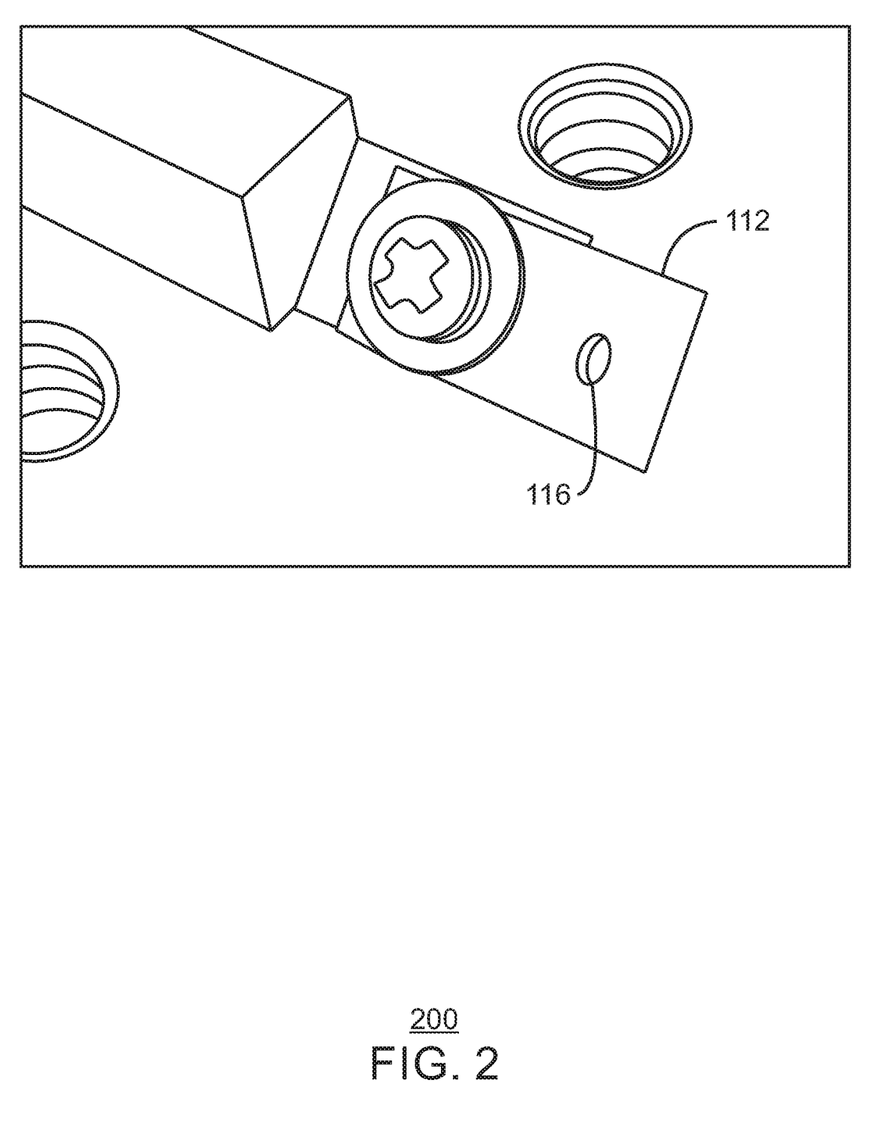
FIG. 2 is a drawing of an annular mirror that may be used in the microscopy system, in accordance with examples.

FIG. 2 is a drawing 200 of an annular mirror 112 that may be used in the microscopy system 100, in accordance with examples. Like numbered items are as described with respect to FIG. 1. The drawing 200 shows the opening 116 through which the droplet ejected by a microfluidic ejector passes to reach a target container.

Figure 3:
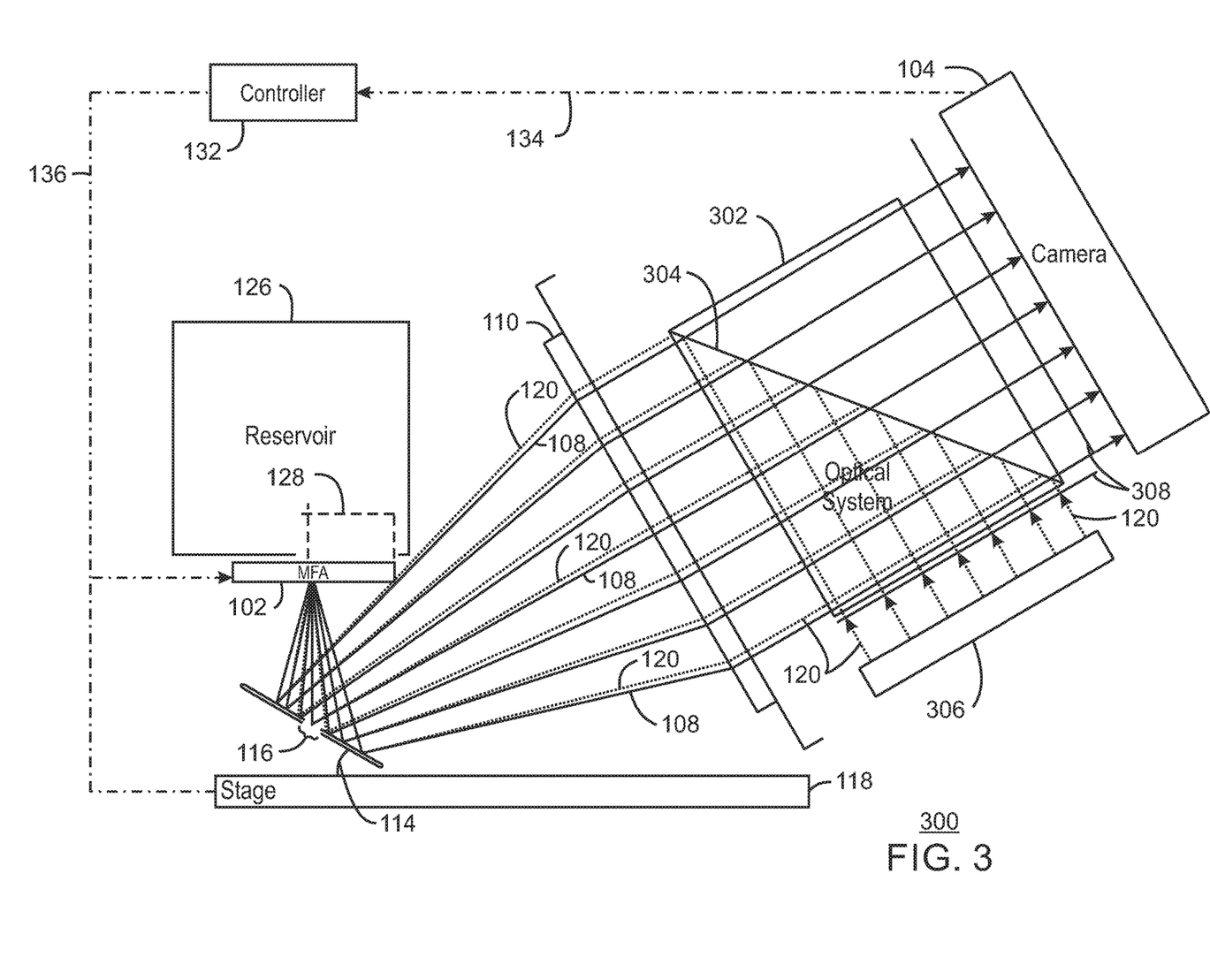
FIG. 3 is a drawing of another microscopy system in which an illuminating optical system provides co-linear illumination with light returned to the camera, in accordance with examples.

FIG. 3 is a drawing of another microscopy system 300 in which an illuminating optical system 302 provides co-linear illumination with light 108 returned to the camera 104, in accordance with examples. Like numbered items are as described with respect to FIG. 1. In this example, the illuminating optical system 302 includes a reflective surface 304, such as a partially silvered mirror or a prism, or another type of beam splitter, that directs the illumination 120 from a co-linear light source 306 through the focusing lens 110 onto the annular mirror 112 to illuminate the microfluidic ejector array 102. The co-linear light source 306 may include any number of sources of illumination. In an example, the co-linear light source 306 includes an array of light emitting diodes. In another example, the co-linear light source 306 includes a laser and optics to expand the beam and direct it linearly into the optical system 302.

Light 108 returning from the microfluidic ejector array 102 passes through the reflective surface 304 and is captured by the camera 104. To enhance the amount of light 108 received by the camera 104, filters 308 may be placed between the co-linear light source 306 and the optical system 302 and between the optical system 302 and the camera 104. In an example, the filters 308 are polarizing filters that are placed perpendicular to each other. In another example, the filters 308 are at an excitation band, such as a 20 nm bandpass filter centered on a wavelength of about 320 nm, between the co-linear light source 306 and the optical system 302, and at an emission band, such as a 50 nm bandpass filter centered on a wavelength of about 450 nm, between the optical system 302 and the camera 104.

In one example, the optical system 106 and camera 104 are part of a brightfield microscope. The bright field microscope includes a long-working-distance microscope objective, as focusing lens 110, a beam splitter, as reflective surface 304, to couple in the illumination 120 which is made by a fiber-coupled light source (halogen lamp), as co-linear light source 306, and a light condenser element (positive lens), along with a tube lens comprised between the beam splitter and the imaging sensor in the camera 104.

FIG. 4 is a process flow diagram of a method 400 for imaging a microfluidic ejector array during operation, in accordance with examples. The method 400 begins at block 402 with placing a mirror with a center opening under the microfluidic ejectors. As described herein, the microfluidic ejectors are part of a microfluidic ejector array, which may be part of an inkjet print head in an inkjet printer cartridge.

At block 404 an optical system is focused on the microfluidic ejectors through the mirror. At block 406 the microfluidic ejectors are fired to eject droplets through the center opening in the mirror. At block 408, the microfluidic ejectors are imaged during the firing.

The image may be analyzed to identify optical properties of material in the microfluidic ejectors or to determine the efficacy of operation of the microfluidic ejectors, among others. In various examples, a region of interest may be located by defining a window in a frame in which data of interest will appear. For example, the window may be defined as having an x-coordinate of between about 500 and 550 pixels and a y-coordinate of between about 800 and 850 pixels.

In another example, the regions of interest are identified by training an artificial intelligence system to locate nozzles and flow paths in a microfluidic ejector array based, at least in part, on a printed output located on a target attached to an X-Y stage below the mirror. In this example, a poorly printed location in the output may be used to identify region of interest in the frames collected, which may allow the location of poorly formed microfluidic ejectors, among others.

Other types of image processing may be performed to determine the optical characteristics of the region of interest. This may include, for example, removing portions of the frame that are not in the regions of interest, background subtraction, background correction, flatness correction, spatial distortion correction, thresholding, gradient calculations, performing spectroscopic calculations, and the like.

In some examples, a determination is made as to whether a material of interest, such as a fluorescent biological material, has been detected. This may be performed by comparing the image of a region of interest to images from a user-determined lookup table to determine the identity of the material.

If a material of interest has been detected, it may be collected in a collection vessel attached to the X-Y stage. In an example, the firing of the microfluidic ejector array is paused. The stage is moved to position a collection vessel is placed under the microfluidic ejector holding the material of interest. The microfluidic ejector holding the material of interest is fired, ejecting a droplet holding the target material into the collection vessel. The X-Y stage is then moved back to a main collection vessel, such as a waste collection vessel. If no material of interest is determined to be within the region of interest, firing of the microfluidic ejector array may continue into the waste collection vessel.

If the microscopy system is being used for the collection of a material of interest, various techniques may be used to process the image, for example, a background image may be subtracted from the collected image to remove structures that are not of interest. In some examples, multiple images are averaged to increase the signal-to-noise ratio, such as to images, four images, five images, or 10 images, or more, depending on the desired increase in the signal-to-noise ratio. In various examples, a spectral vector is determined for strengthening the identification of material of interest. The spectral vector may be a floating-point one D array of the omission power from the material at a number of discrete wavelengths or integrated wavelength ranges. This may be enhanced by the use of different fluorescent stains.

The identification of the material of interest would then be performed by a comparison of the spectral vector with spectral vectors stored in a lookup table. If the spectral vector of the material in the region of interest matches the spectral vector for a target material, the material may be collected by injection into a target collection vessel on an X-Y stage. If the material does not match the spectral vector of the target material, firing of the microfluidic ejector array into the waste collection vessel may continue.

Figure 5:
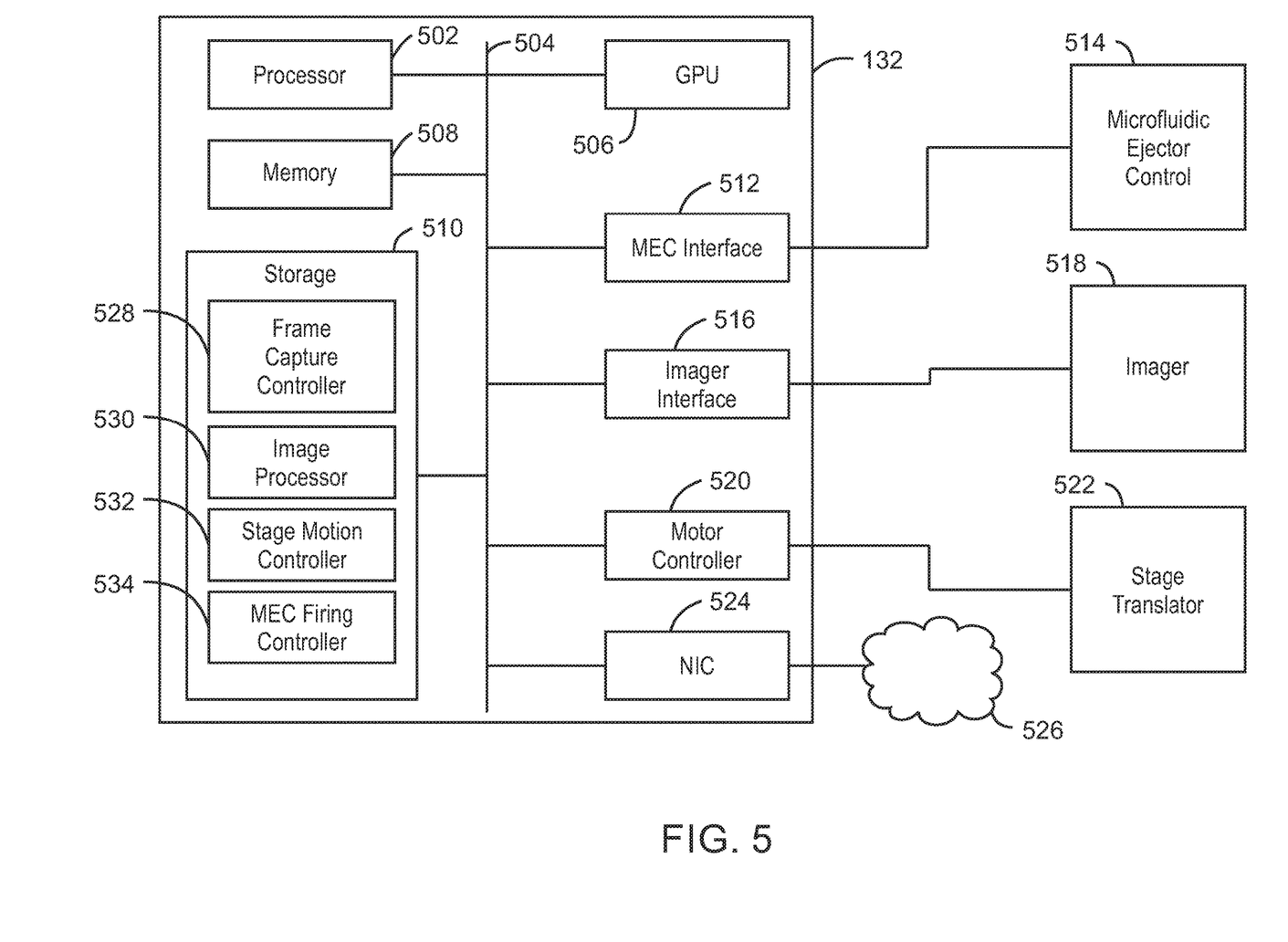
FIG. 5 is a drawing of a controller to perform cellular sorting, in accordance with examples.

FIG. 5 is a drawing of a controller 132 to perform microscopic imaging of a microfluidic ejector array, in accordance with examples. The controller 132 includes a central processing unit (CPU) 502 that executes stored instructions. In various examples, the CPU 502 is a microprocessor, a system on a chip (SoC), a single core processor, a dual core processor, a multicore processor, a number of independent processors, a computing cluster, and the like.

The CPU 502 is communicatively coupled to other devices in the controller 132 through a bus 504. The bus 504 may include a peripheral component interconnect (PCI) bus, and industry standard architecture (EISA) bus, a PCI express (PCIe) bus, high-performance interconnects, or a proprietary bus, such as used on a system on a chip (SoC).

The bus 504 may couple the CPU 502 to a graphics processing unit (GPU) 506, such as units available from Nvidia, Intel, AMD, ATI, and others. If present, the GPU 506 provides graphical processing capabilities to enable the high-speed processing of images from the camera. The GPU 506 may be configured to perform any number of graphics operations. For example, the GPU 506 may be configured to pre-process the plurality of image frames by isolating the region of interest, downscaling, reducing noise, correcting lighting, and the like. In examples that use only spectroscopic techniques, the GPU 506 may not be present.

A memory device 508 and a storage device 510 may be coupled to the CPU 502 through the bus 504. In some examples, the memory device 508 and the storage device 510 are a single unit, e.g., with a contiguous address space accessible by the CPU 502. The memory device 508 holds operational code, data, settings, and other information used by the CPU 502 for the control. In various embodiments, the memory device 508 includes random access memory (RAM), such as static RAM (SRAM), dynamic RAM (DRAM), zero capacitor RAM, embedded DRAM (eDRAM), extended data out RAM (EDO RAM), double data rate RAM (DDR RAM), resistive RAM (RRAM), and parameter RAM (PRAM), among others.

The storage device 510 is used to hold longer-term data, such as stored programs, an operating system, and other code blocks used to implement the functionality of the microscopy system. In various examples, the storage device 510 includes non-volatile storage devices, such as a solid-state drive, a hard drive, a tape drive, an optical drive, a flash drive, an array of drives, or any combinations thereof. In some examples, the storage device 510 includes non-volatile memory, such as non-volatile RAM (NVRAM), battery backed up DRAM, flash memory, and the like. In some examples, the storage device 510 includes read only memory (ROM), such as mask ROM, programmable ROM (PROM), erasable programmable ROM (EPROM), and electrically erasable programmable ROM (EEPROM).

A number of interface devices may be coupled to the CPU 502 through the bus 504. In various examples, the interface devices include a microfluidic ejector controller (MEC) interface 512, an imager interface 516, and a motor controller 520, among others.

The MEC interface 512 couples the controller 132 to a microfluidic ejector controller 514. The MEC interface 512 directs the microfluidic ejector controller 514 to fire microfluidic ejectors in a microfluidic ejector array, either individually or as a group. As described herein, the firing may be performed during imaging of a particular region of a microfluidic ejector array.

The imager interface 516 couples the controller 132 to an imager 518. The imager interface 516 may be a high-speed serial or parallel interface, such as a PCIe interface, a USB 3.0 interface, a FireWire interface, and the like. In various examples, the imager 518 is a high frame-rate camera configured to transfer data and receive control signals over the high-speed interface. In some examples, the imager 518 is a multichannel spectroscopic system, or other optical device.

The motor controller 520 couples the controller 132 to a stage translator 522. The motor controller 520 may be a stepper motor controller or a servo motor controller, among others. The stage translator 522 includes motors, sensors, or both coupled to the motor controller 520 to move the stage and attached print medium or collection vessels, under a microfluidic ejector.

A network interface controller (NIC) 524 may be used to couple the controller 132 to a network 526. In various examples, this allows for the transfer of control information to the controller 132 and data from the controller 132 to units on the network 526. The network 526 may be a wide area network (WAN), a local area network (LAN), or the Internet, among others. In some examples, the NIC 524 connects the controller 132 to a cluster computing network, or other high-speed processing system, where image processing and data storage occur. This may be used by controllers 132 that do not include a GPU 506 for graphical processing. In some examples, a dedicated human machine interface (HMI) (not shown) may be included in the controller 132 for local control of the systems. The HMI may include a display and keyboard.

The storage device 510 may include code blocks used to implement the functionality of the microscopy system. In various examples, the code blocks include a frame capture controller 528 that is used to capture a sequence of frames from the imager 518. In some examples, a GPU 506 is used to identify region of interest, process the region of interest to determine cell types, and determine if a material in the image is a target material.

A stage motion controller 532 directs the motor controller 520 to move the stage translator 522. In some examples, the motor controller 520 is used to move a print medium, such as a piece of paper, under a microfluidic ejector array. In other examples, the motor controller 520 is used to move a capture well on a multiwell plate under a microfluidic ejector to capture a target material. The motor controller 520 is also used to move a waste container under a microfluidic ejector to capture material that does not include a target cell.

An MEC firing controller 534 uses the MEC interface 512 to direct a microfluidic ejector controller 514 to fire a microfluidic ejector. In some examples, this is performed to capture a target material or send a non-target material to a waste container. In other examples, this is performed to print a pattern on a print medium attached to the stage.

Figure 6:
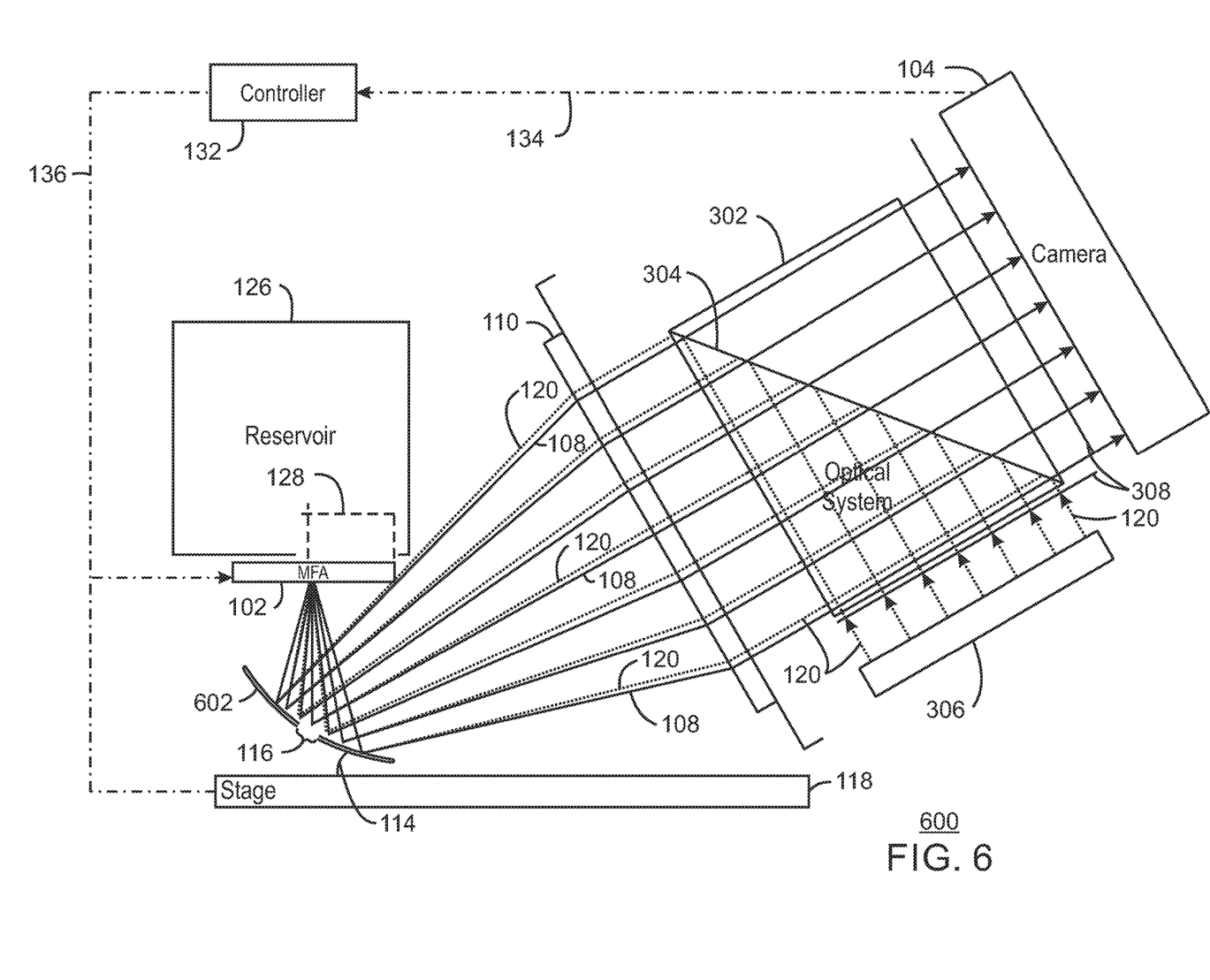
FIG. 6 is a drawing of another microscopy system that uses a convex mirror, in accordance with examples.

FIG. 6 is a drawing of another microscopy system 600 that uses a concave mirror 602, in accordance with examples. Like numbered items are as described with respect to FIGS. 1 and 3. As used herein, the concave mirror 602 has a reflecting surface that has a focal point in the direction of the incoming light. In this microscopy system 600, the concave mirror 602 replaces the annular mirror 112 described with respect to FIG. 1. The use of the concave mirror 602 may provide the ability to focus on a smaller area of the micro fluidic ejector array 102. This may increase the resolution of the imaging, for example, capturing only a few or even one microfluidic ejector. In an example, this is used to image material located inside a nozzle of a microfluidic ejector, which may allow the imaging of the bubble formation on a thermal resistor.

Figure 7:
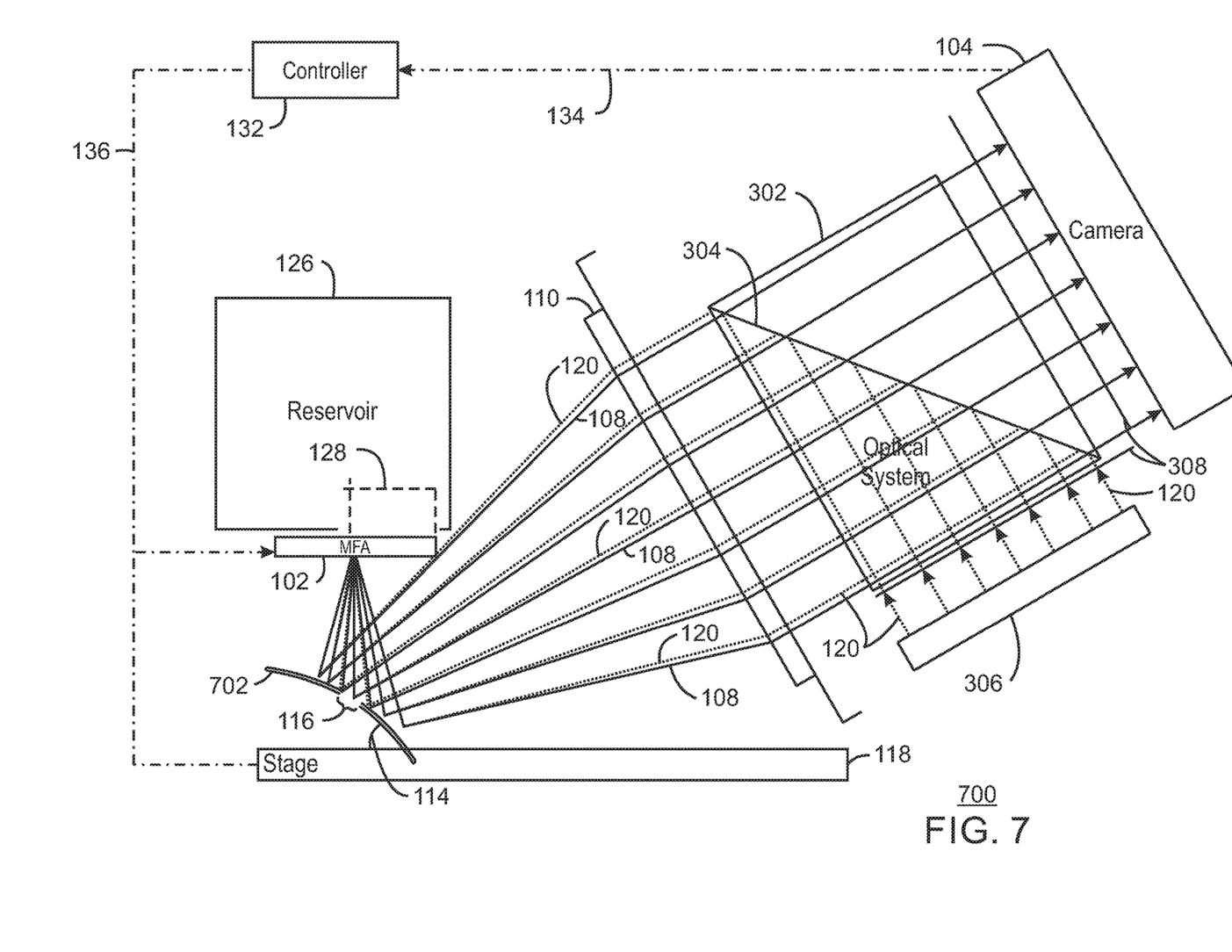
FIG. 7 is a drawing of another microscopy system that uses a concave mirror, in accordance with examples.

FIG. 7 is a drawing of another microscopy system 700 that uses a convex mirror 702, in accordance with examples. Like numbered items are as described with respect to FIGS. 1 and 3. As used herein, the convex mirror 702 has a reflecting surface that has a focal point in the opposite direction of the incoming light. In this microscopy system 700, the concave mirror 702 replaces the annular mirror 112 described with respect to FIG. 1. The use of the convex mirror 702 may provide the ability to move the focusing lens 110, illuminating optical system 302, and camera 104 farther from the microfluidic ejector array 102. This may be useful for allowing less separation between the microfluidic ejector array 102 and a print medium on a top surface of the stage 118. In some examples, this provides more accurate printing to demonstrate issues with microfluidic ejectors in the microfluidic ejector array.

Figure 8:
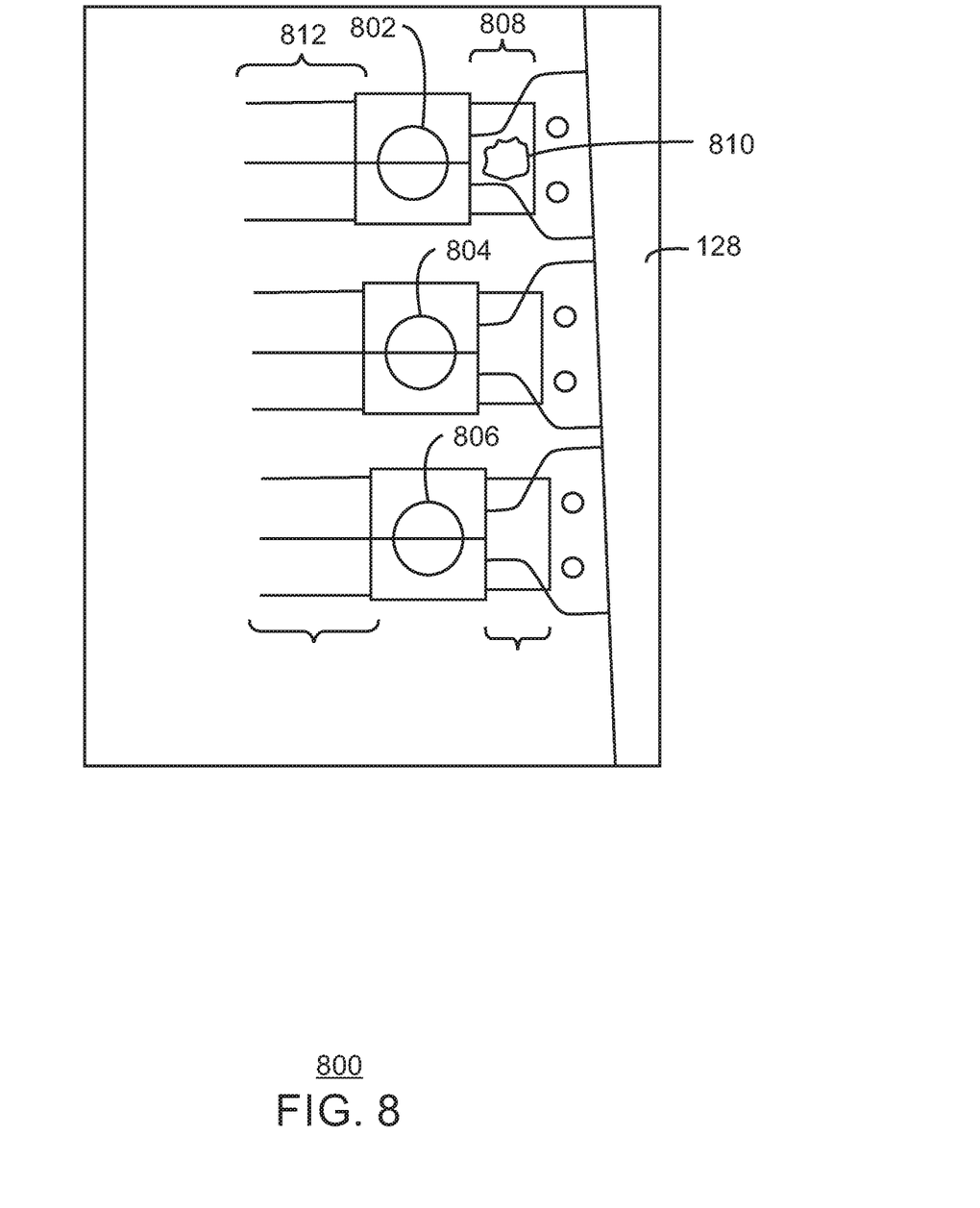
FIG. 8 is an image of nozzles made by an imaging system, in accordance with examples.

FIG. 8 is an image 800 of nozzles 802, 804, and 806 made by an imaging system, in accordance with examples. The image 800, or frame, is of a region-of-interest that includes three nozzles 802, 804, and 806. The nozzles 802-806 are fed from a chamber 128 through flow channels 808. In the image 800, florescence from a material of interest 810 is visible. In an example, the nozzle 802 may be placed over a collection vessel and fired to capture the material of interest 810. In the image 800, the power feeds 812 to the thermal resistor in each nozzle 802, 804, and 806 are visible.

Figure 9:
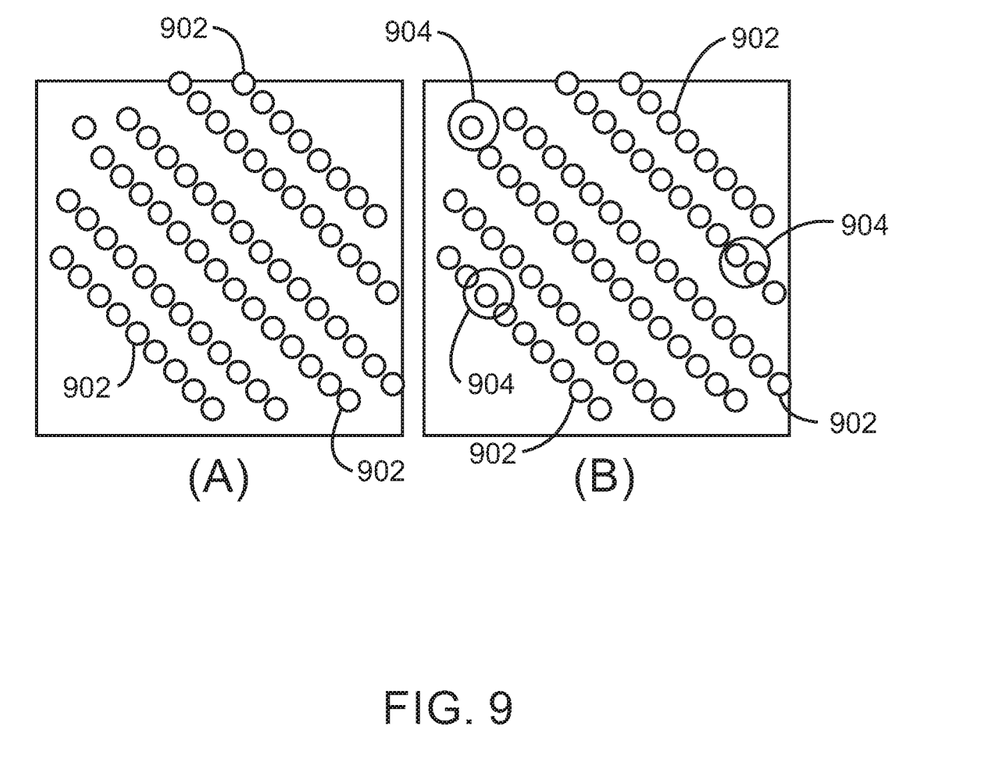
FIG. 9 is a drawing of an example of use of the microscopy system, in accordance with examples.

FIGS. 9(A) and (B) show an example of use of the microscopy system to collect a material of interest, in accordance with examples. In this example, a compartmentalized polymerase chain reaction (PCR) is run in a group of nozzles 902 of a microfluidic ejector array. The PCR is used to make copies of a segment of deoxyribonucleic acid (DNA) through several generations, for example, generating millions of copies of a particular DNA sequence.

Emission from the nozzles 902 may be monitored to identify regions 904 where a target material has reached a sufficient quantity for further processing. In various examples, the material in the regions 904 may then be ejected to separate wells, or channels, of an electrophoresis chip. In the electrophoresis chip, the material may be separated, for example, for genotyping. In this example, the system described with respect to FIG. 7, using the convex mirror 702, may be useful as it may allow the imaging of a larger section of the nozzles 902.

In another example, the microscopy system is used to monitor the functioning of the microfluidic ejectors, such as by determining the temperature of the heating resistor forming the bubble. In this example, the optical device may be an IR spectrophotometer.

In various examples, the microscopy system is used to monitor the flow of fluids to the nozzles for the microfluidic ejectors, such as imaging materials in the flow path to the nozzles. The photoresist polymer used to form the nozzles, which may be SUB, may be transparent to visible light in the range of 350 nm to 700 nm in wavelength, or in the range of 400 nm to 800 nm wavelength.

In another example, the microscopy system is used to monitor drive dynamics, for example, to diagnose printing problems. For example, the microscopy system may monitor the dynamics of bubble formation as a thermal resistor heats to form a bubble to eject fluid from a nozzle in a microfluidic ejector. The microscopy system may also be used to monitor the ejection of fluid from a nozzle when a piezoelectric ejector is fired.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A microscopy system, comprising:
a plurality of microfluidic ejectors;
a mirror disposed in a droplet path of the plurality of microfluidic ejectors,
wherein the droplet path passes through an opening in the mirror; and
an optical system focused on the plurality of microfluidic ejectors reflected by the mirror,
wherein the optical system comprises a camera, and
wherein the mirror is positioned directly under the microfluidic ejectors and is disposed at an angle other than orthogonal to the droplet path to direct light from the microfluidic ejectors toward the camera.

2. The microscopy system of claim 1, wherein the plurality of microfluidic ejectors comprises an inkjet printer head.

3. The microscopy system of claim 1, wherein the mirror comprises a concave surface.

4. The microscopy system of claim 1, wherein the mirror comprises a convex surface.

5. The microscopy system of claim 1, wherein the camera comprises a high frame rate system.

6. The microscopy system of claim 1, wherein the camera comprises a hyperspectral analysis system.

7. The microscopy system of claim 1, wherein the camera comprises a co-linear illumination system.

8. The microscopy system of claim 1, comprising a side illumination system.

9. The microscopy system of claim 1, wherein the imaging system is positioned relative to both the plurality of microfluidic ejectors and the mirror such that at least a portion of an optical path of the imaging system intersects the droplet path of the plurality of microfluidic ejectors.

10. The microscopy system of claim 1, further comprising:
a co-linear light source positioned between the camera and the mirror;
a focusing lens positioned between the camera and the mirror; and
a reflective surface positioned relative to the co-linear light source and the focusing lens such that the reflective surface directs illumination transmitted by the co-linear light source toward the focusing lens.

11. The microscopy system of claim 1, further comprising at least one filter positioned between the mirror and the optical system.

12. The microscopy system of claim 11, wherein the at least one filter comprises at least one polarizing filter.

13. The microscopy system of claim 11, wherein the at least one filter comprises a plurality of polarizing filters, each polarizing filter of the plurality of polarizing filters placed perpendicular to at least one other polarizing filter of the plurality of polarizing filters.

14. The microscopy system of claim 11, wherein the at least one filter is an excitation filter.

15. A method for imaging microfluidic ejectors during operation, comprising:
placing a mirror directly under the microfluidic ejectors at an angle other than orthogonal to a droplet path of the microfluidic ejectors to direct light from the microfluidic ejectors toward an optical system, with a center opening of the mirror positioned under the microfluidic ejectors;
focusing an optical system on the microfluidic ejectors reflected by the mirror;
firing the microfluidic ejectors to eject droplets through the center opening; and
imaging the microfluidic ejectors during the firing.

16. The method of claim 15, comprising illuminating the microfluidic ejectors with a light source that is co-linear to the optical system.

17. The method of claim 15, comprising analyzing data from the optical system to determine a temperature of the microfluidic ejectors during operation.

18. The method of claim 15, comprising analyzing data from the optical system to identify a material in nozzles of the microfluidic ejectors.

19. The method of claim 18, comprising firing the microfluidic ejectors based, at least in part, on an identity of the material in the nozzles.

\* \* \* \* \*